Sept. 15, 1964     E. W. BUSHNELL     3,148,749
ROTOR BRAKE
Filed Aug. 3, 1962                             2 Sheets-Sheet 1
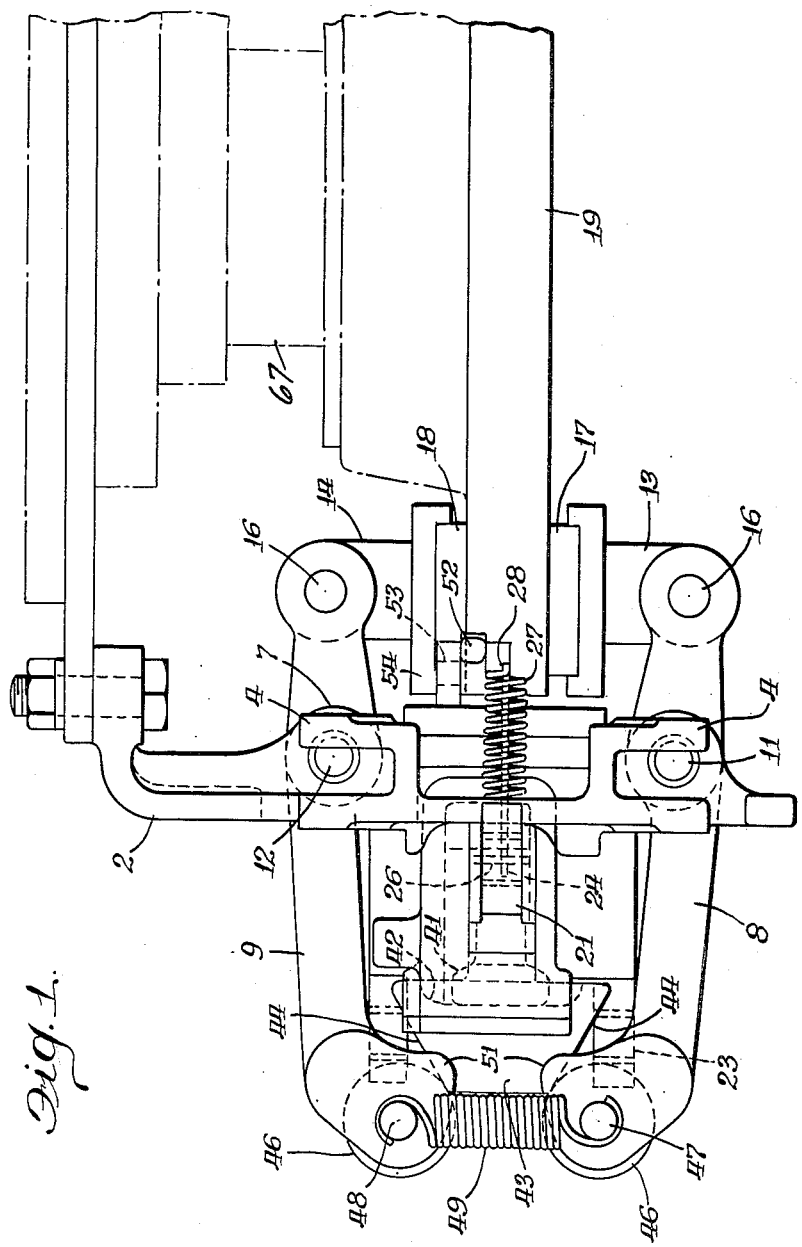
INVENTOR.
Eldon W. Bushnell

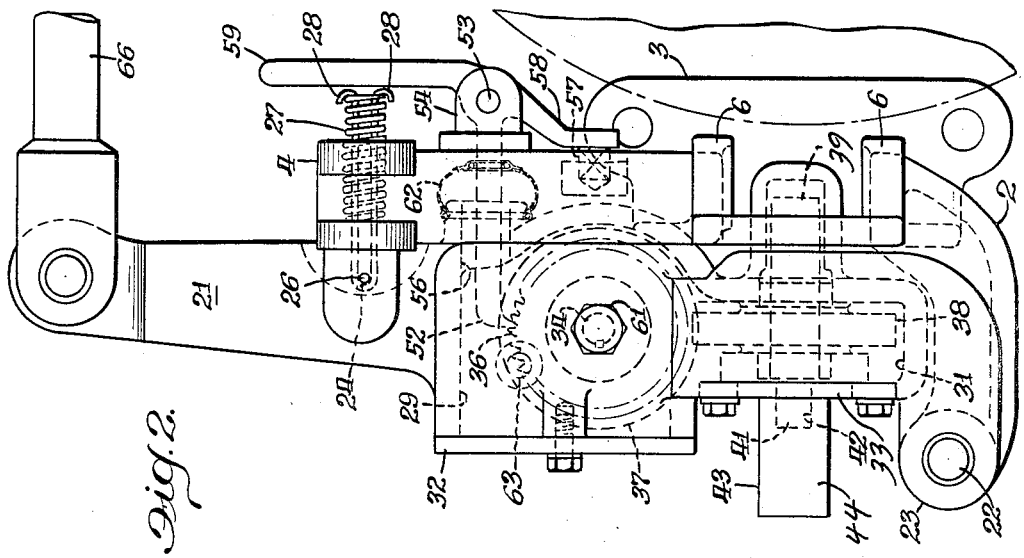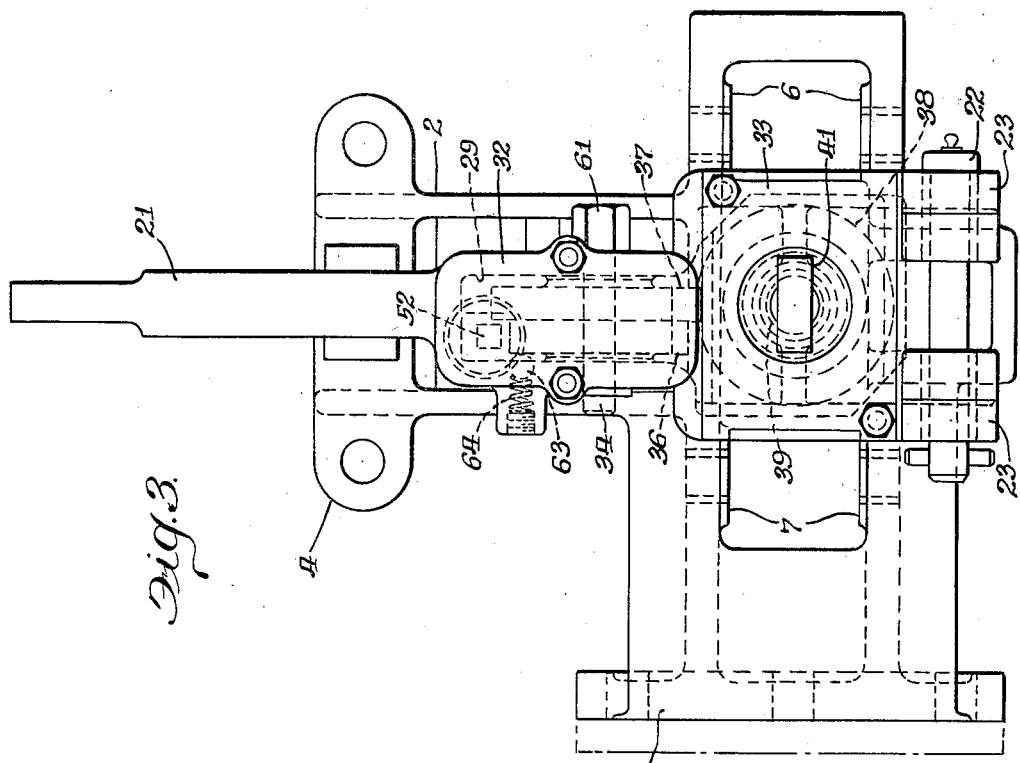

United States Patent Office 3,148,749
Patented Sept. 15, 1964

3,148,749
ROTOR BRAKE
Eldon W. Bushnell, Lansing, Ill., assignor to Amsted Industries Incorporated, Chicago, Ill., a corporation of New Jersey
Filed Aug. 3, 1962, Ser. No. 214,588
7 Claims. (Cl. 188—59)

This invention relates to rotor brakes for railway vehicles and more particularly to improvements in a rotor brake arrangement embodying a slack adjuster operable to compensate for wear of the brake shoes.

An object of the invention resides in the provision of a rotor brake arrangement which is relatively inexpensive in construction and reliable in operation.

Another object of the invention resides in the provision of a rotor brake arrangement in which a pair of brake levers are actuated by means of a wedge carried on a brake operating arm provided with means for adjusting the position of the wedge to compensate for wear of the brake shoes.

A further object of the invention resides in the provision of a rotor brake arrangement embodying a slack adjuster mechanism automatically operable to adjust the position of the wedge responsive to pivotal movement of the brake operating means.

Another object of the invention resides in the provision of a rotor brake slack adjuster embodying means for manually adjusting the position of the wedge relative to the brake levers.

The invention embodies other novel features, details of construction and arrangement of parts which are hereinafter set forth in the specification and claims and illustrated in the accompanying drawings, forming part thereof, wherein:

FIGURE 1 is a top plan view illustrating a rotor brake arrangement embodying features of the invention.

FIGURE 2 is a side elevation of the structure of FIGURE 1, the brake levers being omitted.

FIGURE 3 is a front elevation of the structure shown in FIGURE 2.

Referring now to the drawings for a better understanding of the invention, the rotor brake arrangement is shown as comprising a brake frame 2 having bolt flanges 3 and 4 thereon for detachably mounting the frame in fixed position on a vehicle. Two sets of bearing bosses 6 and 7 are provided on the frame 2 to support brake levers 8 and 9 for pivotal movement on pivot pins 11 and 12, respectively. Brake heads 13 and 14 are pivotally mounted on the inner ends of the brake levers 8 and 9 by means of pivot pins 16, said heads having brake shoes 17 and 18 thereon to frictionally engage opposite sides of a rotor 19 adapted to be secured to a motor or generator drive shaft 57 of a railway car truck.

A brake operating arm 21 is pivotally mounted at its lower end on a pivot pin 22 which extends through aligned openings formed in spaced bearing lugs 23 provided on the lower end of the brake frame 2. The arm 21 is biased against the outer side of the brake frame 2 by means of a spring hook 24 connected at one end thereof to the arm by a pin 26, the other end of the hook extending through an opening in the frame and having a helical compression spring 27 thereon interposed between the brake frame 2 and seat portions 28 formed on the hook.

The brake operating arm 21 is formed with upper and lower communicating chambers 29 and 31, respectively, provided with removable covers 32 and 33. A pin 34 is journaled in openings formed in opposite side walls of the upper chamber 29 to support a ratchet 36 and a driving helical gear 37 which are keyed to the pin for common rotational movement. A driven helical gear 38 is formed with hub portions journaled in the cover 33 and inner wall of the lower chamber 31, the driven gear being in meshing engagement with the gear 37 and internally threaded to receive an adjustment screw 39.

The adjustment screw 39 is formed with a T-shape head 41 for detachable engagement in a socket 42 formed in a wedge 43. The wedge 43 is formed with forwardly converging surfaces 44 for wedge engagement between rollers 46 journaled on pins 47 and 48 mounted on the outer ends of the brake levers 8 and 9. The pins 47 and 48 are interconnected by a tension spring 49 to bias the rollers 46 against their respective wedge surfaces 44. The wedge 43 is engaged against rotational movement by spaced lips 51 formed on each of the brake levers.

A pawl 52 is supported for pivotal movement on a pin 53 mounted on a bracket 54 secured to the inner side of the brake frame 2. The pawl extends through an opening 56 in the inner wall of the upper chamber 29 and engages the teeth of the ratchet 36. A compression spring 57 seated in a recess in the brake frame acts against a pawl arm 58 to yieldably resist movement of the pawl out of engagement with the ratchet teeth. The pawl 52 is provided with a handle 59 to manually disengage the pawl from the ratchet teeth, and the pin 34 is provided with a hexagonal head 61 for engagement by a wrench to manually adjust the position of the screw 39 between the rollers 46. A boot 62 of flexible material is provided on the pawl 52 to seal the opening 56. The ratchet 36 is frictionally engaged against accidental rotational movement by means of a ball 63 biased against the ratchet teeth by a compression spring 64.

In the operation of the brake arrangement to decelerate rotational movement of the rotor 19, the operating arm 21 is pivoted away from the brake frame 2 by the operating rod 66 to move the wedge 43 between the rollers 46 and thereby pivot the brake levers 8 and 9 until the brake shoes 17 and 18 are frictionally engaged against opposite sides of the rotor. Upon release of the operating rod 66, the arm 21 is returned to its retracted position by the spring 27 and hook 24, and the brake levers 8 and 9 are then pivoted by the spring 49 to move the brake shoes away from the rotor.

To eliminate excessive slack due to wear of the brake shoes, the ratchet 36 is rotated, step-by-step, by engagement of the pawl 52 against successive teeth on the ratchet during brake release movement of the operating arm 21. The driving gear 37 then acts through the driven gear 38 to move the adjustment screw 39 axially toward the rollers 46 to cause the wedge 43 to pivot the brake levers to adjusted brake release positions.

To manually adjust the axial position of the screw 39 relative to the driven gear 38, the handle 59 is moved to disengage the pawl 52 from the ratchet 36, and the pin head 61 is rotated by a wrench to cause the driving gear 37 to turn the driven gear 38 to thereby move the screw.

I claim:
1. In a rotor brake arrangement, a brake frame, a pair of brake levers pivotally mounted intermediate their ends on said frame, brake head-shoe assemblies on the inner ends of said levers adapted to frictionally engage a rotor therebetween, a brake operating arm pivotally mounted at its lower end on said frame between said levers, a wedge provided on said arm engaged between the outer ends of said levers, a tension spring interconnecting the outer ends of said levers, resilient means biasing said arm toward its brake release position, and means provided on said arm operable automatically responsive to pivotal movement of said arm toward its brake release position to adjust the position of said wedge and said levers, said adjusting means comprising a driving gear and a driven gear journaled on said arm, said driven gear having a threaded bore, and an adjustment screw mounted in said bore and connected to said wedge.

2. In a rotor brake arrangement, a brake frame, a pair of brake levers pivotally mounted intermediate their ends on said frame, brake head-shoe assemblies on the inner ends of said levers adapted to frictionally engage a rotor therebetween, a brake operating arm pivotally mounted at its lower end on said frame between said levers, a wedge provided on said arm engaged between the outer ends of said levers, a tension spring interconnecting the outer ends of said levers, resilient means biasing said arm toward its brake release position, means provided on said arm operable automatically responsive to pivotal movement of said arm toward its brake release position to adjust the position of said wedge and said levers, said adjusting means comprising a driven gear journaled on said arm and having a threaded bore, and an adjustment screw mounted in said bore and connected to said wedge, and a driving gear rotatably mounted on said arm to drive said driven gear.

3. In a rotor brake arrangement, a brake frame, a pair of brake levers pivotally mounted intermediate their ends on said frame, brake head-shoe assemblies on the inner ends of said levers adapted to frictionally engage a rotor therebetween, a brake operating arm pivotally mounted at its lower end on said frame between said levers, a wedge provided on said arms engaged between the outer ends of said levers, a tension spring interconnecting the outer ends of said levers, a resilient means biasing said arm toward its brake release position, means provided on said arm operable automatically responsive to pivotal movement of said arm toward its brake release position to adjust the position of said wedge and said levers, said adjusting means comprising a driven gear journaled on said arm and having a threaded bore, and an adjustment screw mounted in said bore and connected to said wedge, a driving gear rotatably mounted on said arm to drive said driven gear, and means automatically operable responsive to pivotal movement of said arm to rotate said driving gear.

4. A brake arrangement according to claim 3 in which said automatic means comprises a ratchet connected to said driving gear, and a pawl pivotally mounted on said frame to engage and move said ratchet step-by-step responsive to pivotal movement of said arm.

5. In a rotor brake arrangement, a brake frame, a pair of brake levers pivotally mounted intermediate their ends on said frame, brake head-shoe assemblies on the inner ends of said levers adapted to frictionally engage a rotor therebetween, a brake operating arm pivotally mounted at its lower end on said frame between said levers, a wedge provided on said arm engaged between the outer ends of said levers, a tension spring interconnecting the outer ends of said levers, resilient means biasing said arm toward its brake release position, means provided on said arm operable automatically responsive to pivotal movement of said arm toward its brake release position to adjust the position of said wedge and said levers, said adjusting means comprising a driven gear journaled on said arm and having a threaded bore, an adjusting screw mounted in said bore and connected to said wedge, a driving gear rotatably mounted on said arm to drive said driven gear, and means to manually rotate said driving gear.

6. In a rotor brake arrangement, a brake frame, a pair of brake levers pivotally mounted intermediate their ends on said frame, brake head-shoe assemblies on the inner ends of said levers adapted to frictionally engage a rotor therebetween, a brake operating arm pivotally mounted at its lower end on said frame between said levers, a wedge provided on said arm engaged between the outer ends of said levers, a tension spring interconnecting the outer ends of said levers, resilient means biasing said arm toward its brake release position, means provided on said arm operable automatically responsive to pivotal movement of said arm toward its brake release position to adjust the position of said wedge and said levers, said adjusting means comprising a driven gear journaled on said arm and having a threaded bore, an adjustment screw mounted in said bore and connected to said wedge, a driving gear rotatably mounted on said arm to drive said driven gear, and means to manually rotate said driving gear, said arm having upper and lower communicating chambers, and said gears being mounted within said chambers.

7. A brake arrangement according to claim 6 in which said automatic means comprises a ratchet connected to said driving gear, and a pawl pivotally mounted on said frame to engage and move said ratchet step-by-step responsive to pivotal movement of said arm, and a detent on said arm frictionally engaging said ratchet.

References Cited in the file of this patent

UNITED STATES PATENTS

| | | |
|---|---|---|
| 2,049,628 | Rowland | Aug. 4, 1936 |
| 2,406,201 | Coombes | Aug. 20, 1946 |
| 2,554,064 | Shields | May 22, 1951 |
| 2,812,831 | Coskun | Nov. 12, 1957 |
| 2,911,070 | Seeleg | Nov. 3, 1959 |
| 2,940,553 | Newell | June 14, 1960 |
| 2,979,164 | Altherr | Apr. 11, 1961 |